(12) United States Patent
Marazzani et al.

(10) Patent No.: US 11,021,398 B2
(45) Date of Patent: Jun. 1, 2021

(54) INERTING CLAY MINERALS AND IMPROVING THE EFFECT OF LIQUEFIERS IN CLAY-CONTAINING MINERAL BINDER COMPOSITIONS

(71) Applicant: SIKA TECHNOLOGY AG, Baar (CH)

(72) Inventors: Beat Marazzani, Oberengstringen (CH); Giuseppe Colaiacovo, Oetweil an der Limmat (CH); Christian Bürge, Schafisheim (CH); Franz Wombacher, Jonen (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 15/771,356

(22) PCT Filed: Oct. 25, 2016

(86) PCT No.: PCT/EP2016/075699
§ 371 (c)(1),
(2) Date: Apr. 26, 2018

(87) PCT Pub. No.: WO2017/072126
PCT Pub. Date: May 4, 2017

(65) Prior Publication Data
US 2018/0327312 A1 Nov. 15, 2018

(30) Foreign Application Priority Data
Oct. 26, 2015 (EP) .................................... 15191541

(51) Int. Cl.
| | | |
|---|---|---|
| *C04B 14/00* | (2006.01) | |
| *C04B 28/00* | (2006.01) | |
| *C04B 24/12* | (2006.01) | |
| *C04B 28/02* | (2006.01) | |
| *C04B 40/00* | (2006.01) | |
| *C04B 24/04* | (2006.01) | |
| *C04B 7/00* | (2006.01) | |
| *C04B 7/34* | (2006.01) | |
| *C04B 32/00* | (2006.01) | |
| *C04B 24/26* | (2006.01) | |
| *C04B 103/40* | (2006.01) | |

(52) U.S. Cl.
CPC .......... *C04B 28/001* (2013.01); *C04B 24/045* (2013.01); *C04B 24/121* (2013.01); *C04B 28/02* (2013.01); *C04B 40/0039* (2013.01); *C04B 24/2647* (2013.01); *C04B 2103/408* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,066,431 A | | 1/1978 | Ennis | |
| 4,960,816 A | * | 10/1990 | Rice ........................ | C03C 17/32 |
| | | | | 106/415 |
| 5,407,480 A | * | 4/1995 | Payton ................... | D21H 21/10 |
| | | | | 106/487 |
| 2006/0289164 A1 | * | 12/2006 | Smith ...................... | C09K 8/74 |
| | | | | 166/295 |
| 2015/0041138 A1 | * | 2/2015 | Badel ..................... | C09K 8/607 |
| | | | | 166/308.2 |
| 2015/0344765 A1 | * | 12/2015 | Badel ..................... | C09K 8/035 |
| | | | | 175/65 |

FOREIGN PATENT DOCUMENTS

| | | |
|---|---|---|
| AT | 380 228 B | 4/1986 |
| CN | 101 328 053 A | 12/2008 |
| CN | 101 811 840 A | 8/2010 |
| CN | 102762517 A | 10/2012 |
| CN | 104114669 A | 10/2014 |
| DE | 100 15 135 A1 | 10/2001 |
| EP | 1 138 697 A1 | 10/2001 |
| EP | 1 348 729 A1 | 10/2003 |
| EP | 1 061 089 B1 | 3/2004 |
| EP | 2 341 039 A1 | 7/2011 |
| EP | 2341039 A1 * | 7/2011 ............. C04B 28/14 |
| EP | 2 711 347 A1 | 3/2014 |
| WO | 95/09821 A2 | 4/1995 |
| WO | 97/35814 A1 | 10/1997 |

(Continued)

OTHER PUBLICATIONS

Jan. 23, 2017 International Search Report issued in International Patent Application No. PCT/EP2016/075699.
May 1, 2018 International Preliminary Report on Patentability issued in International Patent Application No. PCT/EP2016/075699.
May 1, 2020 Office Action issued in Australian Patent Application No. 2016345524.
Jul. 3, 2020 Office Action issued in Chinese Patent Application No. 201680062655.9.
Mar. 9, 2021 Office Action issued in Chinese Patent Application No. 201680062655.9.

(Continued)

*Primary Examiner* — James E McDonough
(74) *Attorney, Agent, or Firm* — Oliff PLC

(57) ABSTRACT

The use of an amine compound and/or of a salt of the amine compound to inert clay minerals with respect to dispersants in a mineral binder composition containing clay minerals and/or to improve or increase the effect of a dispersant in a mineral binder composition containing clay minerals, wherein the amine compound has a structure according to formula I:

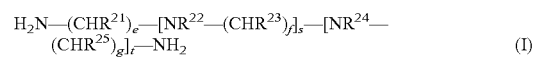

$$H_2N-(CHR^{21})_e-[NR^{22}-(CHR^{23})_f]_s-[NR^{24}-(CHR^{25})_g]_t-NH_2 \qquad (I)$$

and wherein: each s and t, independently of each other, has a value of 0-2; each e, f, and g, independently of each other, has a value of 2-10; each $R^{21}$, $R^{22}$, $R^{23}$, $R^{24}$, and $R^{25}$, independently of each other, represents hydrogen or —$CH_3$.

8 Claims, No Drawings

(56) References Cited

FOREIGN PATENT DOCUMENTS

| WO | 98/58887 A1 | 12/1998 |
|---|---|---|
| WO | 00/23393 A1 | 4/2000 |
| WO | 03/022899 A1 | 3/2003 |
| WO | 2005/090416 A1 | 9/2005 |
| WO | 2006/032786 A2 | 3/2006 |
| WO | 2013/120843 A1 | 8/2013 |
| WO | 2013/124003 A1 | 8/2013 |
| WO | 2015/059100 A1 | 4/2015 |

OTHER PUBLICATIONS

X. Guolong et al. Selections to complete plants for pre-mixing dry blend mortars. Guangming Daily Publishing House, Oct. 31, 2012, Cover Page and pp. 17-19 and 29 (The concise statement of relevance requirement relating to this document is satisfied in view of the translation of the Chinese Office Action (such as at pp. 2 and 3) submitted herewith which indicates the degree of relevance found by the foreign office; see MPEP §609.04(a)(III)).

\* cited by examiner

INERTING CLAY MINERALS AND IMPROVING THE EFFECT OF LIQUEFIERS IN CLAY-CONTAINING MINERAL BINDER COMPOSITIONS

TECHNICAL FIELD

The invention relates to the use of an amine compound and/or of a salt of the amine compound for rendering clay minerals inert to dispersants in a mineral binder composition comprising clay minerals and/or for improving the effect of a dispersant in a mineral binder composition comprising clay minerals. Further aspects of the invention relate to admixtures and compositions comprising an amine compound and also to methods for producing admixtures and compositions.

PRIOR ART

Binder compositions, such as mortar or concrete mixtures, for example, customarily comprise aggregates in addition to a binder, cement for example. Employed as aggregates typically are rock grades in the form of sand and/or gravel. Also known, however, are organic aggregates, examples being plastics such as polystyrene.

In order to improve the workability of the binder compositions at as low as possible a water/binder ratio, moreover, it is customary to use dispersants as plasticizers. The effects of this are not only high workability of the liquid binder composition but also high mechanical strength after curing thereof. Examples of dispersants known to be particularly effective are polycarboxylate-based comb polymers. These comb polymers possess a polymer backbone with side chains bonded to it, and are also referred to as polycarboxylate ethers. Corresponding polymers are described for example in EP 1 138 697 A1 (Sika AG).

The quality of the aggregates here has a great influence on the workability of the binder composition and on the properties of the cured product. Certain aggregates massively influence the water demand and dispersant demand. They include, among others, aggregates comprising clay-containing minerals and/or clays. As compared with more high-grade aggregates, such as fresh river sand or river gravel, for example, the water demand and/or dispersant demand is increased drastically for identical workability, this being undesirable.

Removing the problematic clays, though possible, involves a relatively great effort and is consequently expensive.

In such cases, therefore, the fraction of dispersant is customarily increased, although this entails higher costs, the early compressive strengths are reduced, setting is retarded, and the quality of the cured binder composition may be impaired. With a very high dispersant content, for example, the result may be a concrete which is too harsh or rough.

Another measure is that of adding more water to the binder composition. In that case, however, the cured binder composition has reduced strengths, which is likewise undesirable.

It is also possible to use different dispersants, as for example lignosulfonates which react less sensitively to the various qualities of the aggregates. With dispersants of this kind, however, the maximum achievable reduction in water is typically massively lower.

Also known are specialty admixtures, referred to as clay blockers, which partly neutralize the adverse effects of the clay-containing minerals. In this regard, for example, WO 2006/032786 A2 (Lafarge) discloses the use of cationic polymers. In some cases, however, cationic polymers are not compatible with inexpensive concrete plasticizers such as lignosulfonates or sulfonated naphthalene-formaldehyde condensates, since precipitations may be formed. This removes the possibility of combining lignosulfonates and/or sulfonated naphthalene-formaldehyde condensates, in a mixture with polycarboxylate ethers, with cationic clay blockers.

There therefore continues to be a need for improved solutions for the problems identified above.

SUMMARY OF THE INVENTION

It is an object of the present invention, therefore, to overcome the problems identified above. The aim in particular is to find a solution which allows the use of low-quality aggregates in mineral binder compositions while keeping the water demand and/or dispersant demand as low as possible. This is also to be possible in particular when using aggregates which have high fractions of clay. The objective here is an extremely good workability of the mineral binder compositions, and one which can be maintained over a relatively long time. This should be attainable without, as far as possible, adversely affecting the early compressive strengths of binder compositions prepared by mixing. The solution, moreover, is to operate as far as possible independently of the type or quality of the aggregates and also, in particular, even when using polycarboxylate ethers as dispersants.

Surprisingly it has been found that this object can be achieved through the use of an amine compound of formula I as defined in claim 1.

It has emerged that through the use of the amine compound in accordance with the invention, the water demand and/or the dispersant demand in mineral binder compositions comprising clay minerals can be reduced significantly in conjunction with an improved effect of the dispersant. This is possible in particular when using polycarboxylate ethers as dispersants. Moreover, the workability of the mineral binder compositions can be good and in some cases better, and is retained over a longer time. Furthermore, the amine compounds used in accordance with the invention cause very little impairment, or none at all, of the early compressive strengths of mineral binder compositions.

Without being tied to any theory, it is assumed that the amine compounds of the invention act as clay blockers. Consequently, in mineral binder compositions comprising, for example, clay-containing, swelling sands, the swelling clay minerals can be rendered inert. Since the clay minerals absorb the clay blocker and no longer absorb the dispersants, more particularly polycarboxylate ethers, the latter is available more or less completely for the dispersing of binder, with beneficial consequences for the working properties of the mineral binder composition.

Further aspects of the present invention are subjects of the independent claims. Particularly advantageous embodiments of the invention are apparent from the dependent claims.

CERTAIN EMBODIMENTS OF THE INVENTION

A first aspect of the present invention relates to the use of an amine compound and/or of a salt of the amine compound for rendering clay minerals inert to dispersants in a mineral binder composition comprising clay minerals and/or for improving or increasing the effect of a dispersant in a mineral binder composition comprising clay minerals, wherein the amine compound has a structure according to formula I:

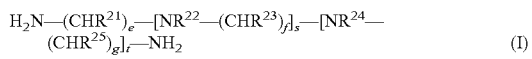

$$H_2N-(CHR^{21})_e-[NR^{22}-(CHR^{23})_f]_s-[NR^{24}-(CHR^{25})_g]_t-NH_2 \quad (I)$$

and wherein each s and t, in each case independently of one another, has a value of 0-2;

each e, f and g, in each case independently of one another, has a value of 2-10;

each $R^{21}$, $R^{22}$, $R^{23}$, $R^{24}$ and $R^{25}$, in each case independently of one another, is hydrogen or —$CH_3$.

The term "dispersant" refers in the present context in particular to a plasticizer. This is a substance which, if added to a mineral binder composition, has the capacity to improve the fluidity or workability of the mineral binder composition after it has been mixed with water. This by comparison with a mineral binder composition which does not comprise the dispersant or plasticizer but otherwise has the same constitution. The fluidity or workability is assessed in particular through the slump test according to standard EN 12350-2.

"Clay" or "clay minerals" refer presently in particular to swellable clays. More particularly clays are sheet silicates, especially swellable sheet silicates. The latter are also called phyllosilicates. Clays of these kinds are particularly problematic in the present context. In particular, the clays or clay minerals contain bentonites and/or minerals of the smectite group, more particularly montmorillonite.

"Rendering clay minerals inert to dispersants" means presently in particular a reduction in the chemical affinity and/or absorptivity of the clay minerals with respect to dispersants. This may also be referred to correspondingly as "clay blocking".

The expression "improving the effect of a dispersant" refers in particular to a further increase to the increase in fluidity and/or workability brought about by the dispersant in the binder composition. The amine compound of the invention, then, is a substance which, if added to a mineral binder composition comprising a dispersant and clays, has the capacity to improve the fluidity or workability of the mineral binder composition after the latter has been mixed with water. This by comparison with a mineral binder composition which does not contain the amine compound but otherwise has the same constitution. Correspondingly, the amine compound is used especially for improving or increasing the fluidity and/or workability of a mineral binder composition comprising a dispersant and clay minerals.

It has emerged that with the amine compound of the invention it is possible, moreover, to extend the working time of the mineral binder compositions. What this means in particular is that the slump spread or slump of a first mineral binder composition, which has been treated with the amine compound, decreases less sharply over time than the slump spread or slump of a second mineral binder compositions which contains no amine compound of the invention but otherwise has a constitution identical with that of the first mineral binder composition.

The amine compound of the invention can therefore be used in particular for extending the working time and/or for prolonging the workability of the mineral binder composition comprising a dispersant and clay minerals.

The amine compound of the invention is therefore preferably used for improving and/or prolonging the workability or fluidity of the mineral binder composition comprising a dispersant and clay minerals.

The expression "mineral binder" refers in particular to a binder which reacts in the presence of water in a hydration reaction to form solid hydrates or hydrate phases. It may be, for example, a hydraulic binder (e.g., cement or hydraulic lime), a latent hydraulic binder (e.g., slag), a pozzolanic binder (e.g., fly ash), or a nonhydraulic binder (gypsum or white lime). A "cementitious binder" refers presently in particular to a binder or binder composition having a cement clinker fraction of at least 5 wt %, more particularly at least 20 wt %, preferably at least 35 wt %, especially at least 65 wt %. The cement clinker is preferably a Portland cement clinker. Cement clinker in the present context means, in particular, ground cement clinker.

A "mineral binder composition", accordingly, denotes a composition comprising a mineral binder and, where appropriate, further components, such as aggregates, water and/or admixtures, for example. Admixtures in the present context are, in particular, concrete admixtures and/or admixtures according to standard EN 934-2.

In particular, the mineral binder or mineral binder composition comprises a hydraulic binder, preferably cement. Particularly preferred is a cement having a cement clinker fraction of 35 wt %. More particularly the cement is of type CEM I, CEM II and/or CEM III (in accordance with standard EN 197-1). Within the mineral binder as a whole, the hydraulic binder fraction is advantageously at least 5 wt %, more particularly at least 20 wt %, preferably at least 35 wt %, especially at least 65 wt %. According to another advantageous embodiment, the mineral binder consists to an extent of 95 wt % of hydraulic binder, more particularly of cement clinker.

It may, however, also be advantageous for the binder or binder composition to comprise or consist of other binders. These are, in particular, latent hydraulic binders and/or pozzolanic binders. Suitable latent-hydraulic and/or pozzolanic binders are, for example, slag, fly ash and/or silica dust. The binder composition may also include inert materials such as limestone, finely ground quartzes, and/or pigments, for example. In one advantageous embodiment the mineral binder contains 5-95 wt %, more particularly 5-65 wt %, very preferably 15-35 wt %, of latent-hydraulic and/or pozzolanic binders. Advantageous latent-hydraulic and/or pozzolanic binders are slag and/or fly ash.

In one particularly preferred embodiment the mineral binder comprises a hydraulic binder, more particularly cement or cement clinker, and a latent-hydraulic and/or pozzolanic binder, preferably slag and/or fly ash. The fraction of the latent-hydraulic and/or pozzolanic binder in this case is very preferably 5-65 wt %, very preferably 15-35 wt %, while there is at least 35 wt %, especially at least 65 wt %, of the hydraulic binder.

The mineral binder fraction is more particularly 1-100 wt %, more particularly 5-50 wt %, especially 10-30 wt %, based on the total weight of the mineral binder composition.

In a further preferred embodiment, the binder composition further comprises solid aggregates, more particularly gravel, sand and/or rock grades. These are more particularly clay-containing sands, clay-containing gravel and/or clay-containing rock grades. Corresponding binder compositions may be used for example as mortar mixtures or concrete mixtures.

The aggregates preferably have a fraction of 5-95 wt %, more particularly 50-90 wt %, especially 60-85 wt %, based on the total weight of the mineral binder composition.

The clay content of the aggregates is situated more particularly in the range of 0.001-5 wt %, more particularly 0.1-4 wt %, especially 0.3-3.5 wt %, in particular 0.5-3.5 wt % or 1-3 wt %. The clay content of the aggregates is determined in particular by the Rietveld method, which is based on X-ray diffraction (XRD). This method is known per se to the person skilled in the art.

As a measure of the clay content of the aggregate it is also possible to employ the figure known as methylene blue value (MBV), particularly for the grain class 0-75 µm. This value may be measured in particular in accordance with the standard of the International Slurry Surfacing Association (ISSA, Annapolis Md.), Technical Bulletin No. 145 "*Test Method for Determination of Methylene Blue Adsorption Value (MBV) of Mineral Aggregate Fillers and Fines*" (Issued 1989; $1^{st}$ Revision 2005). The higher, for example, the amount of swellable clays or clay minerals in the aggregates, the larger the methylene blue value and the lower the quality of the aggregates.

In particular, the binder composition further comprises water, with the weight ratio of water to mineral binder lying preferably in the range of 0.25-0.9, more particularly 0.3-0.8, preferably 0.35-0.7. Binder compositions of this kind can be worked directly as mortar mixtures or concrete mixtures.

The amine compound may be used in neutral form and also partly or wholly as a salt, more particularly as a salt of an acid.

In particular it is possible to use the amine compound as the pure substance, with a purity, for example, of 95 wt %.

It is, however, also possible to use the amine compound in the form of a mixture together with further substances. These may be, for example, solvents, process chemicals and/or additives such as defoamers, preservatives, dyes, concrete admixtures, mortar admixtures, and the like. Concrete admixtures or mortar admixtures may be, for example, dispersants or shrinkage reducers. The amine compound is used in particular together with a dispersant or plasticizer.

The amine compound may optionally also be used in combination with other substances suitable for being adsorbed by clay or themselves dispersing the clay. Examples of such substances are organic or inorganic cations, polar organic molecules, clay dispersants, or mixtures thereof. Particularly suitable substances are, for example, cationic polymers, more particularly those having a cationic charge density of more than 0.5 meq/g and an intrinsic viscosity of below 1 dl/g. The intrinsic viscosity here is measured typically in an NaCl solution (3 mol/l) using a capillary viscometer of Ubbelohde type at 25° C. These cationic polymers also be combined with anionic polymers.

It is also possible to use a mixture in the form of a technical product comprising the amine compound and also byproducts. When the amine compound is used in the form of a mixture, the fraction of the amine compound in the mixture is advantageously at least 30 wt %, more particularly at least 40 wt %, preferably at least 50 wt % or at least 65 wt %.

The mixture is preferably in the form of a solution or dispersion. Aqueous solutions and/or dispersions are preferred.

The amine compound is used, for example, in the form of an aqueous solution, the aqueous solution more particularly having a pH of 2-12, more particularly <7, preferably of 2-6 or of 3-5.

In the case of preferred amine compounds of the formula I, $R^{21}$ is hydrogen and, if present, $R^{22}$ and $R^{23}$ are likewise hydrogen.

According to one particularly preferred embodiment, for the amine compound of the formula I, s=1 and t=0. Preferably in that case, moreover, $R^{21}$, $R^{22}$ and $R^{23}$ are hydrogen.

If s=1 and t=0, it is advantageously the case that e=f. Consequently, symmetrical amine compounds are present, these compounds having proven advantageous in the present context.

In particular, e, f and g, in each case independently of one another, stand for a value of 2-6, more particularly 3-6.

The amine compound in particular contains no quaternary ammonium groups. Moreover, in particular, the amine compound is not a polycationic quaternary amine polymer and/or the amine compound does not react with epoxy compounds to form adducts, before and/or after addition to the mineral binder.

Very preferably the amine compound is selected from the group consisting of 1,5-diamino-2-methylpentane (DAMP), 1,6-diaminohexane, 1,8-diaminooctane, triethylenetetramine (TETA), tetraethylenepentamine (TEPA), pentaethylenehexamine (PEHA), and bis(hexamethylene)triamine. In this case it is also possible for two or more different amine compounds to be used jointly.

Very preferably the amine compound is selected from the group consisting of 1,5-diamino-2-methylpentane (DAMP), 1,6-diaminohexane, and bis(hexamethylene)triamine. Especially advantageous is bis(hexamethylene)-triamine.

Bis(hexamethylene)triamine is also referred to as 6,6'-iminodihexylamine or bis(6-aminohexyl)amine, and has emerged presently as being especially advantageous. In particular, this substance enables a strong and long-lasting improvement in the plasticizing effect of polycarboxylate ethers in clay-containing binder compositions. Furthermore, as a byproduct in the production of raw materials for the manufacture of nylon, bis(hexamethylene)triamine is available inexpensively and in large quantities.

The amine compound is used more particularly in the form of a mixture comprising bis(hexamethylene)triamine and hexamethylenediamine. The two amines here are advantageously present at least partly, more particularly wholly, as salts. The weight fraction of bis(hexamethylene)triamine in the mixture, moreover, is advantageously greater than the weight fraction of hexamethylenediamine. Corresponding mixtures are available commercially from various manufacturers.

According to one particularly advantageous embodiment, the amine compound is present at least partly, more particularly wholly, in the form of a salt. More particularly the salt of the amine compound is a salt with formic, acetic, lactic, adipic, maleic, fumaric, succinic, hydrochloric, sulfuric, phosphoric, methaphosphoric and/or polyphosphoric acid.

Particularly preferred are acetic, adipic and/or formic acid salts of the amine compound, especially adipic and/or formic acid salts of the amine compound.

With particular preference the amine compound comprises an adipic acid salt of 1,6-diamonhexane and/or a formic acid salt of bis(hexamethylene)triamine.

The weight ratio of acid to amine compound in the aforesaid salts is advantageously 75:25-25:75, more particularly 60:40-40:60, especially 50:50.

The amine compound is used advantageously in an amount of 0.01-10 wt %, more particularly 0.02-4 wt %, preferably 0.03-1 wt % or 0.2-0.9 wt %, based in each case on the mineral binder content.

The dispersant is selected in particular from the group encompassing sulfonated vinyl copolymers, lignosulfonates, sulfonated naphthalene-formaldehyde condensates, sulfonated melamine-formaldehyde condensates, polycarboxylates, and polycarboxylate ethers. Combinations or blends of two, three or even more dispersants may also be present.

With particular preference the dispersant comprises a polycarboxylate ether. In combination with polycarboxylate ethers, the amine compounds used in accordance with the invention produce a particularly effective improvement in the fluidity and prolongation of the workability of mineral binder compositions comprising clay minerals.

The polycarboxylate ether in particular has side chains attached via ester, ether, amide and/or imide groups to a main chain. Ester, ether and/or amide groups are preferred, more particularly esters and/or ether groups. The main chain comprises at least one acid unit or a salt thereof. The acid unit is more particularly an alpha-unsaturated monocarboxylic or dicarboxylic acid, such as acrylic acid, methacrylic acid, maleic anhydride, maleic acid, itaconic acid, crotonic acid or fumaric acid. The acid unit is preferably acrylic acid, methacrylic acid, maleic acid and/or a salt thereof and/or combinations thereof.

More particularly the side chains comprise polyalkylene oxide side chains, preferably polyethylene oxide units. Preferably at least 50 mol %, more particularly at least 75 mol %, preferably at least 95 mol % or 100 mol % of the side chains contain or consist of polyalkylene oxide.

The fraction of ethylene oxide units in the polyalkylene oxide side chains, based on all the alkylene oxide units present in the side chains, is preferably more than 90 mol %, more particularly more than 95 mol %, preferably more than 98 mol %, especially 100 mol %.

The polyalkylene oxide side chains preferably have no hydrophobic groups, more particularly no alkylene oxides having three or more carbon atoms. A high proportion of ethylene oxide units or a low level of alkylene oxides having three or more carbon atoms reduces the risk of unwanted introduction of air.

The polyalkylene oxide side chains have in particular a structure of formula $-[AO]_n-R^a$. In this formula, in particular, A is $C_2$ to $C_5$ alkylene, which may be branched or unbranched. $R^a$ is preferably H or a $C_1$ to $C_{20}$ alkyl group, cyclohexyl group, or alkylaryl group. With advantage, n is 2 to 300, more particularly 3 to 200 or 5 to 150.

A weight-average molecular weight ($M_w$) of the polycarboxylate ether is especially 5000-150 000 g/mol, preferably 10 000-100 000 g/mol. A number-average molecular weight ($M_n$) of the polycarboxylate ether is advantageously 3000-100 000 g/mol, more particularly 8000-70 000 g/mol. The weight-average molecular weight is determined by gel permeation chromatography (GPC) using polyethylene glycol (PEG) as standard. This technique is known per se to the person skilled in the art.

The polycarboxylate ether preferably comprises or consists of the following structural subunits:

a) a mole fractions of a structural subunit S1 of the formula Ia

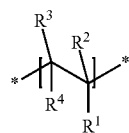

(Ia)

b) b mole fractions of a structural subunit S2 of the formula Ib

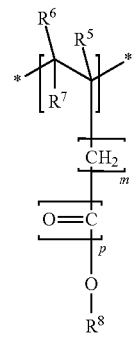

(Ib)

c) optionally c mole fractions of a structural subunit S3 of the formula Ic

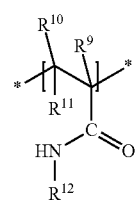

(Ic)

d) optionally d mole fractions of a structural subunit S4 of the formula Id

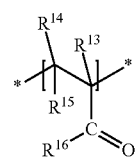

(Id)

where
$R^1$, in each case independently of any other, is —COOM, —SO$_2$-OM, —O—PO(OM)$_2$ and/or —PO(OM)$_2$,
$R^2$, $R^3$, $R^5$, $R^6$, $R^9$, $R^{10}$, $R^{13}$ and $R^{14}$, in each case independently of one another, are H or an alkyl group having 1 to 5 carbon atoms,
$R^4$, $R^7$, $R^{11}$ and $R^{15}$, in each case independently of one another, are H, —COOM or an alkyl group having 1 to 5 carbon atoms,
M, independently of any other, is H$^+$, an alkali metal ion, an alkaline earth metal ion, a di- or trivalent metal ion, an ammonium ion or an organic ammonium group,
m is 0, 1 or 2,
p is 0 or 1,
$R^8$ and $R^{12}$, in each case independently of one another, are a $C_1$ to $C_{20}$ alkyl, cycloalkyl or alkylaryl group or are a group of the formula $-[AO]_n-R^a$,
where A is $C_2$ to $C_4$ alkylene, $R^a$ is H, a $C_1$ to $C_{20}$ alkyl, cycloalkyl or alkylaryl group,
and n is 2 to 300, in particular 3 to 200 or 5 to 150,
$R^{16}$, independently of any other, is NH$_2$, —NR$^b$R$^c$ or —OR$^d$NR$^e$R$^f$, where R$^b$ and R$^c$, independently of one another, are a $C_1$ to $C_{20}$ alkyl, cycloalkyl, alkylaryl or aryl group, or are a hydroxyalkyl group or are an acetoxyethyl (CH$_3$—CO—O—CH$_2$—CH$_2$—) or a hydroxyisopropyl (HO—CH(CH$_3$)—CH$_2$—) or an acetoxyisopropyl (CH$_3$—CO—O—CH(CH$_3$)—CH$_2$—) group;

or R$^b$ and R$^c$ together form a ring of which the nitrogen is a part, in order to construct a morpholine or imidazoline ring;

R$^d$ is a C$_2$ to C$_4$ alkylene group,

R$^e$ and R$^f$ each independently of one another are a C$_1$ to C$_{20}$ alkyl, cycloalkyl, alkylaryl or aryl group or a hydroxyalkyl group, and where a, b, c and d are mole fractions of the respective structural subunits S1, S2, S3, and S4, where
a/b/c/d=(0.05-0.95)/(0.05-0.8)/(0-0.3)/(0-0.3),
more particularly a/b/c/d=(0.3-0.9)/(0.1-0.6)/(0-0.15)/(0-0.15),
preferably a/b/c/d=(0.5-0.8)/(0.2-0.5)/(0-0.1)/0,
and with the proviso that a+b+c+d is 1.

The sequence of the structural subunits S1, S2, S3, and S4 may be alternating, block like or random. It is also possible, moreover, for there to be further structural subunits in addition to the structural subunits S1, S2, S3, and S4.

The structural subunits S1, S2, S3, and S4 together preferably have a weight fraction of at least 50 wt %, more particularly at least 90 wt %, very preferably at least 95 wt %, of the total weight of the polycarboxylate ether.

A ratio of a/(b+c+d)=is in particular in the range of 1-5.

In the polycarboxylate ether, in particular, R$^1$ is COOM, R$^2$ is H or CH$_3$, and R$^3$=R$^4$=H. The polycarboxylate ether can therefore be prepared on the basis of acrylic or methacrylic acid monomers, this being of advantage from an economic standpoint.

Likewise advantageous are polycarboxylate ethers where R$^1$ is COOM, R$^2$ is H, R$^3$ is H, and R$^4$ is COOM. Such polycarboxylate ethers can be prepared on the basis of maleic acid monomers.

Advantageously, R$^5$ is H or CH$_3$ and R$^6$=R$^7$=H. Polycarboxylate ethers of these kinds can be prepared, for example, starting from (meth)acrylic esters, vinyl ethers, (meth)allyl ethers or isoprenol ethers.

If S3 is present, then in particular R$^9$ is H or CH$_3$ and R$^{10}$=R$^{11}$=H.

If S4 is present, then in particular R$^{13}$ is H or CH$_3$ and R$^{14}$=R$^{15}$=H.

Very advantageously, R$^2$ and R$^5$ are mixtures of H and —CH$_3$. Preferred in that case are mixtures with 40-60 mol % H and 40-60 mol % —CH$_3$. If the corresponding structural subunits are present, this is also true, in particular, for R$^9$ and R$^{13}$. With preference, moreover, R$^3$ and R$^6$ are H, and also, if the corresponding structural subunits are present, R$^9$ and R$^{13}$ are H.

According to further advantageous embodiment, R$^1$ is COOM, R$^2$ is H, R$^5$ is —CH$_3$, and R$^3$=R$^4$=R$^6$=R$^7$=H.

In the case of another advantageous embodiment, R$^1$ is COOM, R$^2$=R$^5$=H or —CH$_3$, and R$^3$=R$^4$=R$^6$=R$^7$=H.

In particular, Fe and/or R$^{12}$ are -[AO]$_n$—R$^a$, and preferably A is C$_2$ alkylene and/or R$^a$ is H or a C$_1$ alkyl group. Advantageously, n is 2-300, more particularly n is 3-200, preferably n is 5-150.

In particular, m is 0 and p is 1. Likewise advantageously, m is 1 or 2 and p is 0, and, in particular, R$^5$ is —CH$_3$.

For particularly preferred polycarboxylate ethers:
a) R$^1$ is COOM;
b) R$^2$ and R$^5$, independently of one another, are H, —CH$_3$ or mixtures thereof. Very advantageously, R$^2$ and R$^5$ are mixtures of H and —CH$_3$. Preference in that case is given to mixtures with 40-60 mol % H and 40-60 mol % —CH$_3$. If structural subunits S3 and/or S4 are present, this is also true, in particular, for R$^9$ and R$^{13}$;
c) R$^3$ and R$^6$ are H. If structural subunits S3 and/or S4 are present, this is also true, in particular, for R$^{19}$ and/or R$^{14}$;
d) R$^4$ and R$^7$, independently of one another, are H or -COOM, preferably H. If structural subunits S3 and/or S4 are present, this is also true, in particular, for R$^{11}$ and R$^{15}$;
e) Fe is -[AO]$_n$—R$^a$, and preferably A is C$_2$ alkylene and/or R$^a$ is H or a C$_1$ alkyl group. Advantageously n is 2-300, more particularly n is 3-200, preferably n is 5-150. If structural subunit S3 is present, this is also true, in particular, for R$^{12}$;
f) m is 0 and p is 1.

The polycarboxylate ethers of the invention can be prepared in a way which is known per se. Use is made here in particular of polymer-analogous reaction or radical polymerization.

The polycarboxylate ethers may be prepared by polymer-analogous reaction. In this reaction first of all a main chain is prepared, and is then furnished with side chains. Polymer-analogous reactions are known per se and are described for example in WO97/35814A1, WO95/09821A2, DE 100 15 135A1, EP 1138697A1, EP1348729A1, and WO2005/090416A1. Details relating to polymer-analogous reaction are for example disclosed in EP 1 138 697 B1 at page 7 line 20 to page 8 line 50, and also in the examples contained therein, or in EP 1 061 089 B1 at page 4 line 54 to page 5 line 38 and also in the examples.

The polycarboxylate ethers may also be prepared by a radical polymerization reaction in which the copolymer is obtained from corresponding ethylenically unsaturated acid, ester, and amide monomers in the presence of a radical initiator. This technique is known per se to the person skilled in the art.

In the context of use in accordance with the invention, the amine compound can be added before, during and/or after the mineral binder composition has been prepared by mixing. If added before mixing, the amine compound may be added, for example, to a component of the mineral binder composition—for example, to the binder, to the aggregates, to an admixture and/or to the tempering water.

The dispersant used in the mineral binder composition may likewise be added before, during and/or after the mineral binder composition has been prepared by mixing.

The amine compound and the dispersant here may be added concurrently or with an offset in time. For example, the amine compound and the dispersant can be admixed jointly to the tempering water. It is likewise possible to premix the amine compound and the dispersant in the form of an adjuvant, an aqueous solution, for example, and make the addition during the mixing of the binder composition. Another possibility, however, is—for example—to add the amine compound to the aggregates beforehand, and to add the dispersant only with the tempering water when the binder composition is being prepared by mixing.

With regard to the form of use, the amine compound may be employed, for example, in the form of an admixture, as a formulating component of an admixture, such as of a polycarboxylate ether-based concrete plasticizer, for example, and/or as a coating agent for the (pre)treatment of clay-containing aggregates, such as absorbent sands, for example.

If the mineral binder composition includes not only clay minerals but also recycled aggregates and/or aggregates with high fractions of fines, it can be advantageous to make additional use, together with the amine compound of formula I, of sugar (granulated sugar, sucrose), molasses and/or caramelized sugar. Caramelized sugar has emerged as being particularly preferred in this context.

"Fine fractions" or "fines" refer presently to solids with a particle size 125 μm. The particle size may be determined, for example, by sieve analysis using a sieve having square openings (125×125 μm openings). The fine fractions are, in particular, inert solids and/or solids which are not mineral binders. "Recycled material" is, in particular, crushed and washed demolition material. Both fines and recycled material, like clay minerals, may massively influence the water demand and dispersant demand in mineral binder compositions.

If in addition to clay minerals there are also recycled aggregates and/or aggregates with high proportions of fines present, the aggregates in the mineral binder composition preferably have a water absorption according to standard DIN EN 1097-6:2000+AC:2002+A1:2005 of 0-5 wt %, more particularly 0.1-4 wt %, especially 0.2-4 wt %, in particular 0.4-3.5 wt % or 0.5-3 wt % (water absorption based on the dry mass of the aggregates).

If aggregates with fine fractions are present in the mineral binder composition, the aggregates in particular have a fine fractions content of 0.001-40 wt %, more particularly 1-35, especially 1.5-30 wt % or 3-30 wt %, based on the total weight of all aggregates.

The expression "caramelized sugar" presently stands in particular for browning products which are obtainable by heat treatment or heating of sugar.

Specifically this is a dry heat treatment or dry heating. More particularly it means that the heating takes place in the absence of a liquid, more particularly in the absence of water.

The term "sugar" embraces, in particular, monosaccharides, oligosaccharides, or mixtures thereof. Oligosaccharides are understood presently to be saccharides that are composed of 2-10 identical or different monosaccharides (simple sugars) and are joined to one another by glycosidic bonds. Accordingly, the caramelized sugar comprises, in particular, caramelized monosaccharides and/or caramelized oligosaccharides.

As sugars which serve as starting materials for the production of the caramelized sugars, monosaccharides, oligosaccharides and/or mixtures thereof may be used. They may be present, for example, in the form of glucose syrup, fructose, lactose, dextrose, invert sugars, sucrose, corn syrup, malt syrup, molasses and/or hydrolyzed starch. Other forms of sugar are also possible, however.

The heat treatment of the sugar takes place in particular at atmospheric pressure (1 bar) and in air or in Earth atmosphere.

In the heat treatment, the sugar is heated typically to temperatures of 110-180° C. The sugar in this case is heated more particularly until browning occurs.

In particular the sugar is heated until caramelized sugar having the color intensities and/or color tones defined below is obtained.

The caramelized sugar preferably has a color intensity at a wavelength of 610 nm of 0.005-0.65, more particularly 0.008-0.35, preferably 0.01-0.20 or 0.025-0.09.

More particularly the caramelized sugar has a color intensity at a wavelength of 560 nm of 0.01-0.70, more particularly 0.03-0.45, preferably 0.05-0.30 or 0.06-0.20.

The color intensity here is defined as the absorbance of an aqueous solution containing 1 mg of caramelized sugar (dry matter) per ml of solution (total volume of the solution, including caramelized sugar) at a wavelength of 610 nm and with a light path length of 1 cm. The absorbance (absorptivity) may also be referred to as optical density or extinction and stands for $-\log_{10}$ (I/I$_0$) or for the negative base-ten logarithm of the ratio of the intensity of the radiation emerging from the sample (I) to the intensity of the radiation entering the sample (I$_0$).

A hue index color tone of the caramelized sugar is situated in particular in a range of 3.0-8.0, in particular 3.5-7.5, more particularly 4.0-7.5, preferably 5.0-7.2. This hue index is defined as $10 \times \log_{10}$ (A$^{510}$/A$^{610}$), where A$^{510}$ and A$^{610}$ are the absorbances at 510 nm and 610 nm respectively.

The caramelized sugar more particularly comprises or consists of caramel. "Caramel" presently is a browning product obtained exclusively by heating sugar, e.g., sucrose. In the production of caramel, in particular, no reaction accelerators or no further substances are used.

According to another advantageous embodiment, the caramelized sugar comprises or consists of caramel color.

Caramel color is, more particularly, a substance conforming to Einecs Index No. 232-435-9 and/or CAS Registry number 8028-89-5.

Caramel color may be produced in a similar way as for caramel, but usually with the further addition of reaction accelerators during the heat treatment or during caramelizing. These accelerators are bases or acids, for example.

Use is made more particularly as reaction accelerators of one or more substances from the group of sodium hydroxide solution, sodium sulfite, potassium sulfite, sulfurous acids, sulfite compounds, and ammonium compounds. Caramel colors differing in composition are formed according to the particular reaction accelerator used in their production.

The caramel color is more particularly a caramel color of type INS No. 150, preferably 150a, 150b, 150c and/or 150d. The type here is defined in line with the internationally recognized Codex Alimentarius of the Joint FAO/WHO Expert Committee on Food Additives (see, for example, Compendium Of Food Additive Specifications; Joint FAO/WHO Expert Committee on Food Additives, 74$^{th}$ Meeting 2011; ISBN 978-92-5-107004-8; pages 9-20). Within the European sphere, the INS number is customarily prefixed with the letter "E". In this case, for example, INS No. 150a corresponds to E150a.

For the preparation of caramel color of type INS No. 150a, also called plain caramel color, sodium hydroxide solution or strong acids are used as reaction accelerators. In the case of caramel color of type INS No. 150b, also referred to as caustic sulfite caramel color, reaction accelerators used are sulfite compounds, as for example sodium sulfite, potassium sulfite, or sulfurous acids. In the case of caramel color of type INS No. 150c, also called ammonia caramel color, ammonium compounds are employed as reaction accelerators. Caramel color of type INS No. 150d, also called ammonium sulfite caramel color, is prepared by means of sulfite compounds and ammonium compounds.

Advantageous in the present context is caramel color of type INS No. 150a and/or 150d. Especially preferred is the type INS No. 150a.

The caramelized sugar is used advantageously in an amount of 0.0005-10 wt %, more particularly 0.001-2 wt %, preferably 0.004-0.5 wt %, based in each case on the dry content of the caramelized sugar and based on the amount of mineral binder in the mineral binder composition.

With advantage the caramelized sugar is used in the form of an aqueous solution having a dry caramelized sugar content of 0.01-90 wt %, more particularly 10-80 wt %, preferably 25-75 wt % or 35-70 wt %. This has the particular virtue of enabling effective metering.

The use of caramelized sugar in combination with the amine compound of formula I has the advantage that the effect of dispersants in mineral binder compositions comprising not only the clay minerals but also recycled aggregates and/or aggregates with high proportions of fines can be improved unexpectedly.

Further details of the use of caramelized sugar in mineral binders are found in WO 2015/059100 A1 (Sika Technology AG), which is hereby incorporated by reference.

Likewise a subject of the invention is an admixture, more particularly for improving the effect of a dispersant in a mineral binder composition containing an amine compound as described above, the amine compound being present at least partly, more particularly wholly, in the form of a salt.

With advantage, the salt of the amine compound involved is a salt with formic, acetic, lactic, adipic, maleic, fumaric, succinic, hydrochloric, sulfuric, phosphoric, methaphosphoric and/or polyphosphoric acid. Particularly preferred are acetic and/or formic acid salts of the amine compound, especially adipic and/or formic salts of the amine compound.

The admixture more particularly comprises an amine compound selected from acetic and/or formic acid salts of bis(hexamethylene)triamine. Likewise advantageous is an adipic acid salt of 1,6-diamonhexane.

The weight ratio of acid to amine compound in the aforementioned salts is advantageously 75:25-25:75, more particularly 60:40-40:60, especially 50:50.

The admixture here is present in particular as a solution or dispersion, more particularly as an aqueous solution or dispersion. The fraction of solvent or water in this case is more particularly 10-90 wt %, preferably 25-75 wt %, especially 30-70 wt %.

In an additional aspect, the invention relates to a composition comprising an amine compound of the formula I as described above and/or an admixture as described above, and also at least one representative from the group consisting of mineral binders, aggregates, and admixtures for mortar and/or concrete.

Admixtures for mortar and/or concrete here are, in particular, substances of the kind defined according to EN 934-2. More particularly they are accelerators, retarders, air entrainers, defoamers, shrinkage reducers, corrosion inhibitors, preservatives, stabilizers and/or dyes. Also included in this are sugar and also caramelized sugar as described above.

The composition may be present in a solid, liquid or pastelike condition.

The composition preferably comprises the amine compound and at least one dispersant or at least one plasticizer as described above. The at least one plasticizer comprises in particular a polycarboxylate ether. In that case the composition more particularly is an admixture composition, preferably a polycarboxylate ether-based concrete admixture, with the amine compound representing, in particular, a formulation component.

In this case the weight ratio of amine compound of formula I to the at least one dispersant is advantageously in a range of 1:50-50:1, preferably 1:10-10:1, in particular 1:10-5:1, especially 1:8-2:1 or 1:2-2:1.

According to one specific embodiment, the composition comprises or consists of the following components:
a) 2-70 wt %, more particularly 10-60 wt %, preferably 15-50 wt % of a dispersant or plasticizer,
b) 0.2-60 wt %, more particularly 1-40 wt %, preferably 3-30 wt % of the amine compound of formula I, more particularly at least partly in the form of a salt as described above,
c) 10-95 wt %, more particularly 40-90 wt %, preferably 50-80 wt % of water,
d) 0-50 wt %, more particularly 0-10 wt % or 0.001-5 wt %, of further admixtures, such as, for example, accelerators, retarders, air entrainers, defoamers, shrinkage reducers, corrosion inhibitors, preservatives, stabilizers and/or dyes.

The weight figures here are based in each case on the dry content or the actual active ingredient content of the respective components and also on the total weight of the composition.

In this case the composition is more particularly a concrete admixture and/or mortar admixture, with the amine compound of formula I as a formulation component.

The invention pertains, furthermore, to a mineral binder composition comprising at least one mineral binder and an amine compound of formula I and/or an admixture as described above comprising a salt of the amine compound. Optionally, moreover, the mineral binder composition may comprise as-described aggregates, admixtures and/or tempering water. More particularly the mineral binder composition comprises an as-described dispersant, preferably a polycarboxylate ether, and also clay-containing aggregates, more particularly clay-containing sand, clay-containing gravel and/or clay-containing rock grades, as described earlier on.

The mineral binder composition here may be in a solid, liquid or pastelike state.

The invention relates, moreover, to a cured binder composition which is obtainable by mixing a mineral binder composition as described above with water and subsequently curing it.

A further aspect of the present invention relates to a method comprising a step of adding an amine compound of formula I and/or an admixture as described above, comprising a salt of the amine compound, to a mineral binder, to aggregates, to tempering water and/or to an admixture for concrete and/or mortar. This method is more particularly a method for producing a composition as described above, and is preferably a method for producing a mineral binder composition.

Especially the method is a method for producing a mineral binder composition comprising at least one mineral binder, in which case an amine compound of formula I and/or an admixture as described above, comprising a salt of the amine compound, are/is added to at least one component of the binder composition before, during and/or after the binder composition has been prepared by mixing.

The amine compound and/or the above-described admixture comprising a salt of the amine compound may be admixed, for example, to the tempering water. An alternative possibility is to mix at least a part of amine compound and/or of the admixture with the mineral binder, with any aggregates and/or with a further admixture for concrete and/or mortar, before the composition is prepared by mixing.

In particular it is possible for example, before the mineral binder composition is prepared by mixing, to mix or coat at least one component of the mineral binder composition, more particularly the mineral binder and/or aggregates, with the amine compound and/or with the admixture comprising a salt of the amine compound. With preference the aggregates are mixed or coated. In this case the amine compound may for example be added as early as in a gravel works.

The dispersant used in the mineral binder composition may likewise be added before, during and/or after the preparation by mixing of the mineral binder composition.

The amine compound and the dispersant here may be added concurrently or with an offset in time.

According to one preferred embodiment, the amine compound and the dispersant are added jointly to the mineral binder composition, in particular by their addition to the tempering water.

It may likewise be advantageous to premix the amine compound and the dispersant in the form of an admixture, such as in the form of an aqueous solution, and add them during the preparation of the binder composition by mixing. Another possibility, however, is to add the amine compound to the aggregates beforehand and to add the dispersant only with the tempering water when the binder composition is being prepared by mixing.

Further advantageous embodiments of the invention are apparent from the working examples below.

Working Examples

1. Substances and Materials

The following substances were used for the working examples (table 1):

TABLE 1

| Designation | Substance | Source |
|---|---|---|
| PCE | Sika ViscoCrete ® RMC-1; polycarboxylate ether with structural subunits S1, S2, and S3, as described above); 30 wt % in $H_2O$ | Sika Schweiz |
| BHT | Bis(hexamethylene)triamine; 50 wt % in $H_2O$ | Sigma-Aldrich, Switzerland |
| $AS_{98}$ | Formic acid; 98 wt % | Sigma-Aldrich, Switzerland |
| $AS_{50}$ | Formic acid; 50 wt % in $H_2O$ | Sigma-Aldrich, Switzerland |
| Sul | Sulfuric acid; 50 wt % in $H_2O$ | Sigma-Aldrich, Switzerland |
| AH | Hexamethylenediamine salt of adipic acid (crystalline) | BASF Schweiz AG |
| DO | 1,8-Diaminooctane; 50 wt % in $H_2O$ | Sigma-Aldrich, Switzerland |
| DH | 1,6-Diaminohexane; 50 wt % in $H_2O$ | Sigma-Aldrich, Switzerland |
| DAMP | 1,5-diamono-2-methylpentane; 50 wt % in $H_2O$ | Sigma-Aldrich, Switzerland |
| TETA | Triethylenetetramine; 50 wt % in $H_2O$ | Sigma-Aldrich, Switzerland |
| TEPA | Tetraethylenepentamine; 50 wt % in $H_2O$ | Sigma-Aldrich, Switzerland |
| PEHA | Pentaethylenehexamine; 50 wt % in $H_2O$ | Sigma-Aldrich, Switzerland |
| FL | Floquat FL4250RD (polydiallyldimethylammonium chloride; polyDADMAC; cationic); 25 wt % in $H_2O$ | SNF, France |
| Jeff | Jeffamine ® EDR-148 (polyetheramine) | Huntsman, Belgium |
| Standard sand | River sand, washed and dried ($MBV^{1)}$ = 6-7 mg/g sand) | Kieswerk Hauser AG, Switzerland |
| AdR | Arena del Rio sand (sand with high to very high clay fraction; $MBV^{1)}$ = 590-630 mg/g sand) | Ingenieria Extractiva Manuel Rodriguez y CIA, S.A. de C.V, Dolores Hidalgo, Estado de Guanajuato. Mexico |
| RSA | NPC Old River Sand (sand with moderate clay fraction; $MBV^{1)}$ = 115-125 mg/g sand) | Natal Portland Cement, South Africa |
| Filler | Nekafill (limestone filler) | Netstal AG, Switzerland |

$^{1)}$MBV = methylene blue value (grain class 0-75 μm) measured according to the standard of the International Slurry Surfacing Association (ISSA, Annapolis Maryland), Technical Bulletin No. 145 "*Test Method for Determination of Methylene Blue Adsorption Value (MBV) of Mineral Aggregate Fillers and Fines*" (Issued 1989; 1st Revision 2005).

2. Production of Admixtures

Different solutions of amine compounds A1-A10 were produced by mixing the components indicated in table 2. The solutions thus produced represent admixtures.

TABLE 2

(all figures in wt %)

| Component | A1 | A2 | A3 | A4 | A5 | A6 | A7 | A8 | A9 | A10* |
|---|---|---|---|---|---|---|---|---|---|---|
| BHT | 51 | 70 | — | — | — | — | — | — | 50 | — |
| DH | — | — | — | 50 | — | — | — | — | — | — |
| DO | — | — | — | — | 50 | — | — | — | — | — |
| TETA | — | — | — | — | — | 50 | — | — | — | — |
| TEPA | — | — | — | — | — | — | 50 | — | — | — |
| PEHA | — | — | — | — | — | — | — | 50 | — | — |
| Jeff | — | — | — | — | — | — | — | — | — | 50 |
| AH | — | — | 50 | — | — | — | — | — | — | — |
| $AS_{50}$ | 49 | — | — | — | — | — | — | — | — | — |
| $AS_{98}$ | — | 15 | — | 50 | 50 | 50 | 50 | 50 | — | 50 |
| Sul | — | — | — | — | — | — | — | — | 50 | — |
| Water | — | 15 | 50 | — | — | — | — | — | — | — |
| pH | 4.1 | 10.6 | n.d. | n.d. | n.d. | n.d. | n.d. | n.d. | n.d. | n.d. | n.d. = not determined

*= not inventive

3. Mortar Mixtures

The mortar mixtures MM1-MM2 used have the dry compositions described in table 3.

TABLE 3

| Component | MM1 | MM2 |
|---|---|---|
| Cement | 600 g | 600 g |
| Filler | 100 g | 100 g |
| Standard sand 0-1 mm | 176 g | 176 g |
| Standard sand 1-4 mm | 804 g | 804 g |
| Standard sand 4-8 mm | 603 g | 603 g |
| AdR sand (0-0.5 mm) | 236 g | — |
| AdR sand (0.5-1 mm) | 237 g | — |
| AdR sand (1-2 mm) | 179 g | — |
| AdR sand (2-8 mm) | 177 g | — |
| RSA sand (0-0.5 mm) | — | 236 g |
| RSA sand (0.5-1 mm) | — | 237 g |
| RSA sand (1-2 mm) | — | 179 g |
| RSA sand (2-8 mm) | — | 177 g |

Cement used was Schweizer CEM I 42.5 N (a mixture of cements composed of Normo 4 [Holcim AG/Siggenthal], Vigier CEM I 42.5N [Vigier Ciment AG] and CEM I 42.5 N [Jura Cement/Wildegg] in a weight ratio of 1:1:1).

The mortar mixtures were prepared by dry-mixing the sands, the fillers, and the cement in a Hobart mixer for 1 minute. Over the course of 30 seconds, the tempering water, optionally admixed previously with the dispersant (PCE) and/or with one of the solutions of the amine compounds, was added and mixing took place for a further 2.5 minutes. The total wet mixing time was 3 minutes in each case.

4. Test Methods

The fluidity or workability of the mortar compositions was determined on the basis of the slump. This determination is made 3, 30, 60, and 90 minutes after the preparation of the mortar compositions by mixing. The slump (SM) was determined in analogy to standard EN 12350-2, adapted for mortar.

Furthermore, the compressive strengths were determined at various times after preparation by mixing. The test for determining the compressive strength (in MPa or N/mm$^2$) was in accordance with standard EN 196-1.

5. Results

Table 4 summarizes the results using various additives in mortar mixtures MM1 and MM2.

TABLE 4

(all wt % based on cement content)

| No. | Mortar mixture (w/c) | PCE added [wt %] | Additive/ addition [wt %] | Slump [mm] after | | | |
|---|---|---|---|---|---|---|---|
| | | | | 3 min | 30 min | 60 min | 90 min |
| V1 | MM1 (0.6) | — | — | <25 | n.m. | n.m. | n.m. |
| V2 | MM1 (0.6) | 0.87 | — | 95 | 41 | 24 | 13 |
| V3 | MM1 (0.6) | 0.65 | A1/0.50 | 95 | 62 | 46 | 35 |
| V4 | MM1 (0.6) | 0.65 | A3/0.32 | 97 | 61 | 42 | 34 |
| V5 | MM1 (0.6) | 0.65 | A4/0.32 | 96 | 55 | 34 | 22 |
| V6 | MM1 (0.6) | 0.70 | A5/0.33 | 94 | 55 | 31 | 21 |
| V7 | MM1 (0.6) | 0.77 | A6/0.33 | 93 | 41 | 42 | — |
| V8 | MM1 (0.6) | 0.77 | A7/0.33 | 94 | 50 | 29 | 19 |
| V9 | MM1 (0.6) | 0.77 | A8/0.33 | 93 | 48 | 25 | 15 |
| V10 | MM1 (0.6) | 0.65 | A9/0.33 | 95 | 52 | 32 | 15 |
| V11 | MM1 (0.6) | 0.65 | A10/0.33 | 52 | 24 | 17 | n.m. |
| V12 | MM1 (0.6) | 0.65 | FL/0.42 | 94 | 67 | 50 | 25 |
| V13 | MM2 (0.6) | 0.52 | — | 93 | 65 | 45 | 41 |
| V14 | MM2 (0.6) | 0.42 | — | 85 | 57 | 46 | 23 |
| V15 | MM2 (0.6) | 0.42 | FL/0.42 | 95 | 65 | 52 | 28 |
| V16 | MM2 (0.6) | 0.42 | A2/0.39 | 95 | 75 | 60 | 50 |

TABLE 4-continued (all wt % based on cement content)

| No. | Mortar mixture (w/c) | PCE added [wt %] | Additive/ addition [wt %] | Slump [mm] after | | | |
|---|---|---|---|---|---|---|---|
| | | | | 3 min | 30 min | 60 min | 90 min |
| V17 | MM2 (0.6) | 0.65 | A3/0.32 | 97 | 59 | 48 | 39 |
| V18 | MM2 (0.6) | 0.42 | A4/0.39 | 96 | 60 | 45 | 30 | n.m. = not measurable, owing to excessive stiffness

In the case of experiment V2 (only PCE, no amine compound) a compressive strength of 13.1 MPa (after 1 day) and 20.7 MPa (after 2 days) was measured.

The corresponding values for experiment V3 (PCE added in lower amount, additional amine compound) are 13.0 MPa (after 1 day) and 20.4 MPa (after 2 days).

Experiments V1-V3 here demonstrate that through the use of inventive amine compounds (experiment V3) the workability of mortar mixtures with high clay fractions can be maintained more effectively over time than with significantly higher levels of addition of the dispersant (PCE; experiment V2). This is possible, moreover, with no adverse effect on the development of the compressive strengths within the first two days.

Furthermore, a comparison of experiments V13-V18 (all with mortar mixture MM2) shows in particular that the inventive amine compounds (experiments V16-V18) are able to maintain the workability of the mortar mixtures over time more effectively than a cationic polymer based on polyDADMAC (experiment V15). Especially advantageous in this context are the solutions A2 and A3, which are based on bis(hexamethylene)triamine and on 1,6-diaminohexane, respectively.

If experiments V3-V10 are contrasted with experiment V11 (solution A10; not inventive), the advantages of the inventive amine compounds relative to polyetheramines (Jeff) are also clearly apparent.

In summary it is found that by using amine compounds of the invention it is possible to improve significantly, and maintain effectively over a relatively long time, the workability even of mineral binder compositions, with relatively low levels of addition of dispersants. This is possible, moreover, without adversely affecting the compressive strengths of the mineral binder compositions. Without amine compounds of the invention, properties of this kind are achievable only at high levels of addition of dispersant, something which, however, is not very economical and may have adverse consequences for the quality of mortar.

The invention claimed is:

1. A method comprising utilizing an amine compound and/or a salt of the amine compound, where the salt of the amine compound is not a salt of the amine compound with a dicarboxylic acid, to render clay minerals inert to dispersants in a mineral binder composition comprising clay minerals and/or to improve the effect of a dispersant in a mineral binder composition comprising clay minerals, wherein the amine compound has a structure according to formula I:

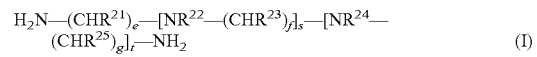

and wherein each s and t, in each case independently of one another, has a value of 0-2;

each e, f and g, in each case independently of one another, has a value of 2-10;

each $R^{21}$, $R^{22}$, $R^{23}$, $R^{24}$ and $R^{25}$, in each case independently of one another, is hydrogen or —$CH_3$; and the amine compound comprises at least one representative from the group consisting of bis(hexamethylene)triamine and 1,6-diaminohexane.

2. The method as claimed in claim 1, wherein the amine compound is used in an amount of 0.01-10 wt % based in each case on the mineral binder content.

3. The method as claimed in claim 1, wherein the dispersant is selected from the group encompassing sulfonated vinyl copolymers, lignosulfonates, sulfonated naphthalene-formaldehyde condensates, sulfonated melamine-formaldehyde condensates, polycarboxylates and/or polycarboxylate ethers.

4. The method as claimed in claim 3, wherein the dispersant comprises a polycarboxylate ether.

5. The method as claimed in claim 1, wherein the binder composition comprises clay-containing aggregates.

6. An admixture for improving the effect of a dispersant in a mineral binder composition comprising an amine compound, the amine compound being present at least partly in the form of a salt, where the salt of the amine compound is not a salt of the amine compound with a dicarboxylic acid; wherein the amine compound has a structure according to formula I:

$$H_2N\text{—}(CHR^{21})_e\text{—}[NR^{22}\text{—}(CHR^{23})_f]_s\text{—}[NR^{24}\text{—}(CHR^{25})_g]_t\text{—}NH_2 \quad (I)$$

where each s and t, in each case independently of one another, has a value of 0-2;

each e, f and g, in each case independently of one another, has a value of 2-10;

each $R^{21}$, $R^{22}$, $R^{23}$, $R^{24}$ and $R^{25}$, in each case independently of one another, is hydrogen of –$CH_3$;

the amine compound comprises at least one representative from the group consisting of 1,5-diamino-2-methylpentane (DAMP), 1,6-diaminohexane, 1,8-diaminooctane, triethylenetetramine (TETA), tetraethylenepentamine (TEPA), pentaethylenehexamine (PEHA), and bis(hexamethylene)-triamine; and the salt of the amine compound comprises an acetic and/or formic acid salt of bis(hexamethylene)triamine.

7. A method comprising adding the admixture of claim 6 to a mineral binder in an amount effective to improve the effect of a dispersant comprised therein.

8. A cured binder composition obtained by mixing the admixture as claimed in claim 6 with water and least one mineral binder and then curing it.

* * * * *